United States Patent [19]

Terada et al.

[11] Patent Number: 5,447,066
[45] Date of Patent: Sep. 5, 1995

[54] ANGULAR VELOCITY SENSOR HAVING A TUNING FORK CONSTRUCTION AND ITS METHOD OF MANUFACTURE

[75] Inventors: Jiro Terada, Hirakata; Hiroshi Takenaka, Ikoma; Masaharu Ushihara; Toshihiko Ichinose, both of Hirakata; Sumitake Yoshida, Suita; Masami Tamura, Uji, all of Japan

[73] Assignee: Matsushita Electric Industrial Co. Ltd., Kadoma, Japan

[21] Appl. No.: 114,145

[22] Filed: Sep. 1, 1993

[51] Int. Cl.6 ............................................. G01P 9/04
[52] U.S. Cl. ................................................ 73/504.16
[58] Field of Search ..................... 73/505, 510, 493; 310/329, 370, 321

[56] References Cited

U.S. PATENT DOCUMENTS

| | | | |
|---|---|---|---|
| 3,683,213 | 8/1972 | Staudte | 310/9.6 |
| 4,550,475 | 11/1985 | Ishigami et al. | 29/25.35 |
| 4,671,112 | 6/1987 | Kimura et al. | 73/505 |
| 5,216,315 | 6/1993 | Terada et al. | 73/505 |

FOREIGN PATENT DOCUMENTS

| | | | |
|---|---|---|---|
| 60-49215 | 3/1985 | Japan | 73/505 |
| 60-67815 | 4/1985 | Japan | 73/505 |
| 62-15410 | 1/1987 | Japan | 73/505 |
| 3179267 | 8/1991 | Japan | 73/505 |
| 5-45168 | 2/1993 | Japan . | |

*Primary Examiner*—Hezron E. Williams
*Assistant Examiner*—Helen C. Kwok
*Attorney, Agent, or Firm*—Willian Brinks Hofer Gilson & Lione

[57] ABSTRACT

The present invention relates to an angular velocity sensor utilized as a gyroscope and particularly, to a high-performance angular velocity sensor having a tuning-fork construction. The vibrator is formed of a metal base plate which is bent about 90 degrees along a center line defined by two opposite slits extending from their respective side edges to a central region of the metal base plate so that its two bent parts are orthogonal to each other. Two piezoelectric elements are bonded to the corresponding surfaces of the two parts of each vibrator which in turn serve as an actuator and a detector.

7 Claims, 4 Drawing Sheets

ANGULAR VELOCITY SENSOR HAVING A TUNING FORK CONSTRUCTION AND ITS METHOD OF MANUFACTURE

BACKGROUND OF THE INVENTION

The present invention relates to an angular velocity sensor known as a gyroscopic instrument and more particularly, to a high-performance angular velocity sensor having a tuning-fork construction where two vibrator units containing piezoelectric elements are coupled to each other and a method of fabricating the same.

A conventional gyroscopic inertia navigation system includes mechanical rotor gyros for determining the direction of a moving object, e.g. an airplane or ship.

Such a mechanical gyroscopic system is steady in performance but bulky in size, thus increasing the cost of production and precluding its application to any small-sized pertinent apparatus.

Also, an oscillator-type angular velocity sensor is known for detecting a "Coriolis force" with its detector while it is vibrating but not rotating. Such a sensor commonly employs a piezoelectric or electromagnetic oscillation mechanism.

The detection of an angular velocity in the sensor is implemented by sensing a vibration torque of a frequency equal to that of the mass of a gyro which is not rotating but vibrating at a constant rate. The vibration torque is known as the Coriolis force generated when an angular velocity is involved.

The oscillator-type angular velocity sensor can detect the amplitude of the vibration torque to determine an angular velocity. Particularly, a variety of oscillator-type angular velocity sensors employing piezoelectric elements have been introduced (for example, as depicted in the Proceeding of Japanese Institute of Aviation and Space, Vol. 23, No. 257, pp. 339–350).

One of the conventional tuning-fork structure oscillator-type angular velocity sensors will now be described referring to FIGS. 5 to 7. The arrangement of the angular velocity sensor is best illustrated in FIG. 5 which consists mainly of four piezoelectric bimorphous elements serving as an actuator, a monitor, and a first and a second detectors. The actuator 101 is orthogonally coupled by a joiner 105 to the first detector 103 constituting a first vibrator 109 while the monitor 102 is orthogonally coupled by another joiner 106 to the second detector 104 constituting a second vibrator 110. The first and the second vibrators 109, 110 are coupled to each other by a connector 107 which is supported at a point by a support 108, thus constructing a tuning-fork structure.

When the actuator 101 of piezoelectric bimorphous element is loaded with a sine-wave voltage signal, its inverse piezoelectric effect causes the first vibrator 109 to vibrate. Then, the action of the tuning-fork structure results in vibration of the second vibrator 110.

Accordingly, the monitor 102 of piezoelectric bimorphous element generates a charge on its surface through its piezoelectric action. The charge is proportional to the sine-wave voltage signal applied to the actuator 101. Hence, a constant, continuous action of vibration is developed by controlling the sine-wave voltage signal to the actuator 101 so that the charge generated by the monitor 102 remains uniform in amplitude.

The action of the angular velocity sensor for producing an output corresponding to an angular velocity involved will be explained referring to FIGS. 6 and 7. FIG. 6 is a top view of the angular velocity sensor of FIG. 5. As shown, the turning movement at an angular velocity of $\omega$ produces a Coriolis force on the first detector 103 which vibrates at a speed of v. The Coriolis force is at a right angle to the speed v and its magnitude is $2mv\omega$ (where m is the equivalent mass at the distal end of the first detector 103).

As the first detector 103 vibrates at the speed v, the second detector 104 is responsive to vibrate at $-v$ and a Coriolis force on the second detector 104 is $-2mv\omega$. The two detectors 103 and 104 are stressed in opposite directions by their respective Coriolis forces, as shown in FIG. 7 thus producing charges on the surface through their piezoelectric actions.

When the speed v of vibration created by fork oscillation is expressed by:

$$v = a \cdot \sin \omega_0 t$$

ps where a is the amplitude of the vibration and $\omega_0$ is the period of the vibration, the Coriolis force is:

$$Fc = a \cdot \omega \cdot \sin \omega_0 t$$

While the angular velocity $\omega$ is proportional to the vibration amplitude a, the Coriolis force causes either of the two detectors 103 and 104 to deflect in one direction. Hence, the surface charge Q on the detectors 103 and 104 is expressed by:

$$Q \propto a \cdot \omega \cdot \sin \omega_0 t$$

When the vibration amplitude a is controlled to a constant, $$Q \propto \omega \cdot \sin \omega_0 t$$

As understood, the surface charge Q is found proportional to the angular velocity $\omega$ and can be converted to a direct current signal through synchronous transaction at $\omega_0 t$.

In theory, if the angular velocity sensor is subjected to a translational movement rather than rotation, its two detectors 103 and 104 produce two charges of the same polarity and their resultant DC signals are suppressed by each other, thereby generating no output.

However, the two signals derived from the unwanted charges are not always canceled to zero because of a symmetrical error and a difference in weight between the two, left and right, prongs of the tuning-fork structure. Conventional angular velocity sensors in which a plurality of piezoelectric bimorphous elements are assembled in a relatively complex manner may not be identical in quality.

For overcoming these disadvantages, best care is taken to assemble the tuning-fork structure to ensure the symmetry and balance of the fork structure. So far, such efforts are found to be unsuccessful and fail to cancel both undesired signals. The two unwanted signals cause the sensor to deteriorate the thermal characteristics and become oversensitive to external interruption or vibration.

Another conventional tuning-fork structure oscillator-type angular velocity sensor has each prong made by twisting a metal base plate to form two, detector and actuator, parts and is known as a bend-type structure sensor which is improved in structural strength. Unfortunately, the metal base plate is bent along off the center line. This creates an undesired stress at the bend causing a displacement or change in the orthogonal relation between the detector and the actuator upon thermal variation. As the result, it is not possible for the angular velocity sensor of this type to maintain the offset output change to a minimum throughout a wide range of temperature.

Furthermore, a modified conventional tuning-fork structure angular velocity sensor is provided in which the metal base plate is replaced with a metal base block for ensuring no change in the orthogonal relation and giving a higher accuracy in performance. The sensor offers better thermal characteristics without changing the orthogonal relation but is more expensive.

The present invention is directed towards eliminating the above disadvantages and its object is to provide an improved angular velocity sensor which has better thermal characteristics and particularly, is less costly.

SUMMARY OF THE INVENTION

It is an object of the present invention to provide an improved angular velocity sensor which has been assembled without impairing the symmetrical balance of its construction and has steady thermal characteristics with minimum effects of aging and higher resistance to external vibration.

For achievement of the above object, the angular velocity sensor according to the present invention comprises a pair of vibrators, each consisting of an actuator and a detector coupled orthogonal to each other, arranged in parallel to a detecting axis and coupled at the actuator side to each other to form a tuning-fork structure. The vibrator is formed of a metal base plate which is bent about 90 degrees along a center line defined by two opposite slits extending from their respective side edges to a central region of the metal base plate so that its two bent parts are orthogonal to each other. Two piezoelectric elements are bonded to the corresponding surfaces of the two bent parts of each vibrator which are arranged orthogonal to each other.

In particular, the center bending line is located in substantially the center of the metal base plate as defined between the two innermost ends of their respective oppositely extending slits. The metal base plate is bent into two parts along the center bending line so that its two parts form at substantially a right angle to each other. As the two slits of the metal base plate are determined to specific, precise positions, the accuracy of the bending line and angle will be guaranteed. Accordingly, the actuator and the detector are aligned along the center line of the vibrator. During vibration, the detector remains balanced in weight against the actuator and will hardly be deviated or less affected by the vibrating action. Hence, unwanted signal components are rarely generated from the detectors and the angular velocity sensor will give a minimum of output offset signal change throughout a wide range of temperature.

As the two slits of the metal base plate located at the predetermined positions allow the bending accuracy to increase, the resultant tuning-fork structure of the angular velocity sensor will be fabricated with much ease and precision to ensure a higher symmetrical balance.

DETAILED DESCRIPTION OF THE INVENTION

One preferred embodiment of the present invention will be described referring to the accompanying drawings.

Figure 1:
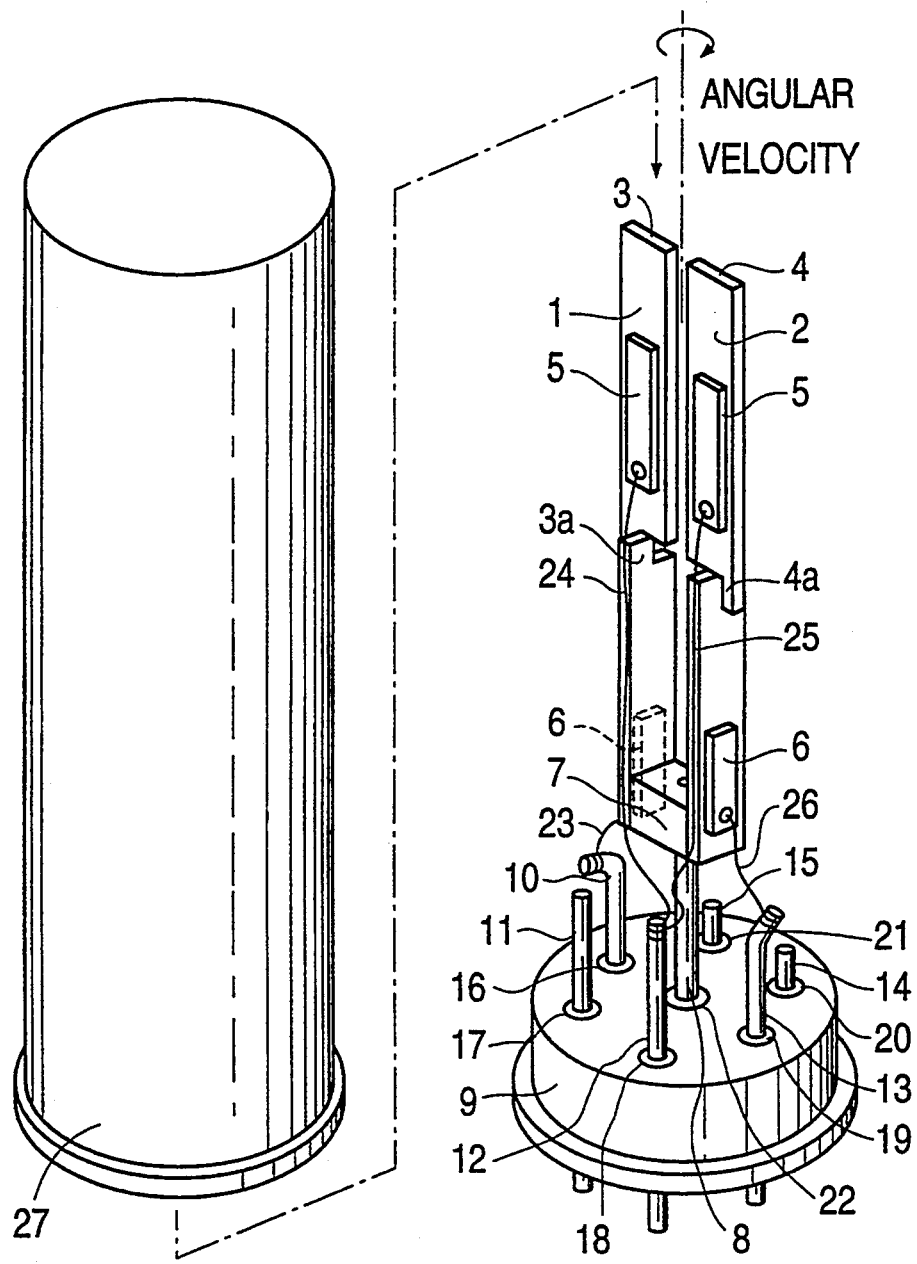
FIG. 1 is a perspective view of an angular velocity sensor showing one preferred embodiment of the present invention.

FIG. 1 is a schematic view of an angular velocity sensor of the present invention and the description will start with two vibrators of the angular velocity sensor. The two vibrators 1 and 2 include metal base plates 3 and 4 of Fe/Ni alloy respectively, each metal base plate being bent substantially 90 degrees along its center bending line defined by two opposite slits extending horizontally from side to center so that its upper and lower parts are orthogonal to each other. The upper and lower parts of the metal base plate 3 or 4 separated by the center bending line or bend 3a or 4a have two piezoelectric elements 5 and 6 bonded to the surfaces thereof respectively. Each of the piezoelectric elements 5 and 6 is formed of a piezoelectric ceramic substance sandwiched between two electrodes made of Ag. Accordingly, the two, upper and lower, parts of the vibrator 1 or 2 serve as a detector and an actuator respectively which are separated by the center bend 3a or 4a and substantially orthogonal to each other.

Figure 2A:
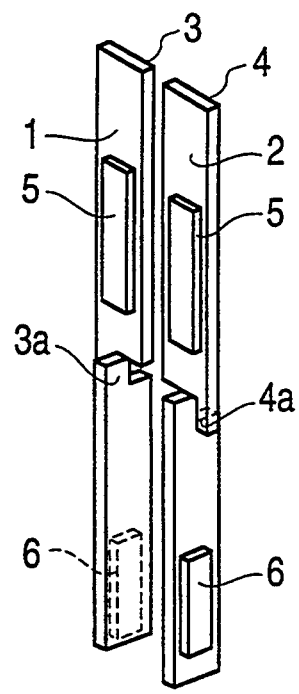
FIG. 2(a) is a perspective view of two vibrators of the angular velocity sensor of the embodiment.
Figure 2B:
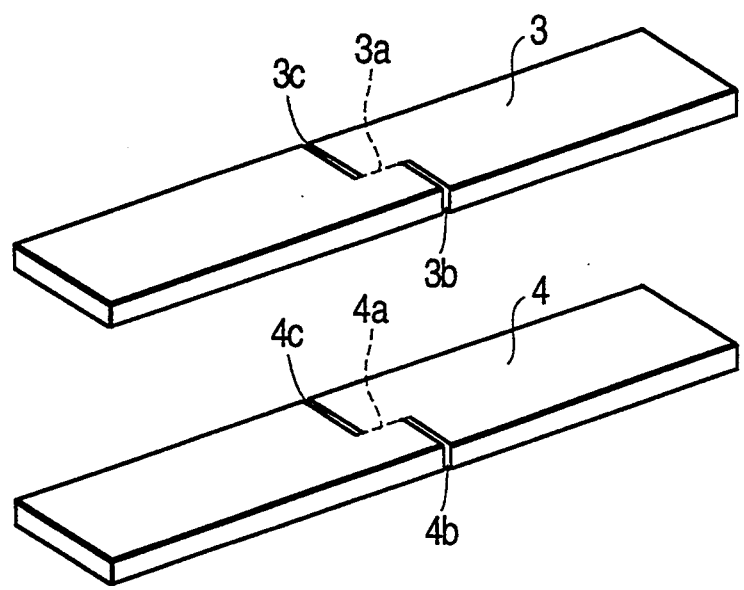
FIG. 2(b) is a perspective view of metal base plates explaining the fabrication of the angular velocity sensor of the embodiment.

The method of fabricating the angular velocity sensor will now be explained referring to FIG. 2. FIG. 2(a) is an external view of the two vibrators 1 and 2 prior to assembling to a tuning-fork construction according to the present invention. FIG. 2(b) illustrates the two metal base plates 3 and 4 of their respective vibrators 1 and 2 which have at central region a pair of slits 3b, 3c and 4b, 4c respectively for ease of bending. More specifically, the two slits 3b and 3c of the metal base plate 3 extend widthwisely from both side edges to a central region to determine the center bending line denoted by the dotted line. The metal base plate 3 is bent 90 degrees along the center bending line defined by the two slits 3b and 3c, thus forming the bend 3a previously explained using FIG. 2(a). Similarly, the metal base plate 4 is bent 90 degrees along the center bending line defined by the two oppositely extending slits 4b and 4c. As the result, each of the metal base plates 3 and 4 is shaped so that its upper and lower parts become orthogonal to each other.

Then, the piezoelectric elements 5 and 6, each consisting of a piezoelectric ceramic substance and two Ag electrodes provided on both sides of the ceramic substance, are bonded to the two parts of each of the metal base plates 3 and 4 respectively separated by the center bend 3a or 4a, whereby the two vibrators 1 and 2 shown in FIG. 2(a) are completed. More particularly, the two piezoelectric elements 5 and 6 are bonded using an epoxy adhesive and also, connected to electrical lead lines respectively.

The two, left and right, vibrators 1 and 2 of FIG. 2(a) are coupled at the actuator end to each other in parallel relationship by a metal block 7 (FIG. 1) forming a vibrator section of the tuning-fork construction. The metal block 7 has an opening provided in the center thereof and a support 8 is inserted at one end into the opening for supporting the metal block 7.

The support 8 is fixedly secured at the other end to a terminal base 9. The terminal base 9 is made of Fe mainly and has a plurality of lead terminals 10, 11, 12, 13, 14, and 15 implanted thereto by glass insulators 16, 17, 18, 19, 20, and 21 respectively. Also, a glass insulator 22 is mounted between the support 8 and the terminal base 9.

The three lead terminals 10, 12, and 13 are arranged for connecting electric signals from the piezoelectric elements 5 and 6 to the outside. In addition, lead wires 23, 24, 25, and 26 are provided for connecting the piezoelectric elements 5 and 6 to the lead terminals 10, 12, and 13. The tuning-fork assembly is protected with a container cap 27 which is made of Fe and welded to the outer edge of the terminal base 9.

The action of the angular velocity sensor of the embodiment will be described in detail. First, the actuator side piezoelectric element of either the vibrator 1 or 2 is loaded with an AC signal. For example, when the AC signal is applied to the piezoelectric element 6 at the lead terminal 13 side, the piezoelectric element 6 starts operating to cause the vibrators 1 and 2 to vibrate at both sides of the support 8. It is known that application of an angular velocity to the vibrating system involves generation of a physical force (the Coriolis force). Accordingly, the piezoelectric elements 5 provided at the detector sides of their respective vibrators 1 and 2 can produce an angular velocity signal. In common, the operational characteristics of the tuning-fork device are determined by the quality and performance of the piezoelectric elements 5 and 6 and of the vibrators 1 and 2.

The performance of the angular velocity sensor of the present invention will be explained in comparison with that of a conventional tuning-fork angular velocity sensor. The conventional angular velocity sensor is a type in which the detector and the actuator are formed on a metal base plate bent at its side region.

Figure 4:
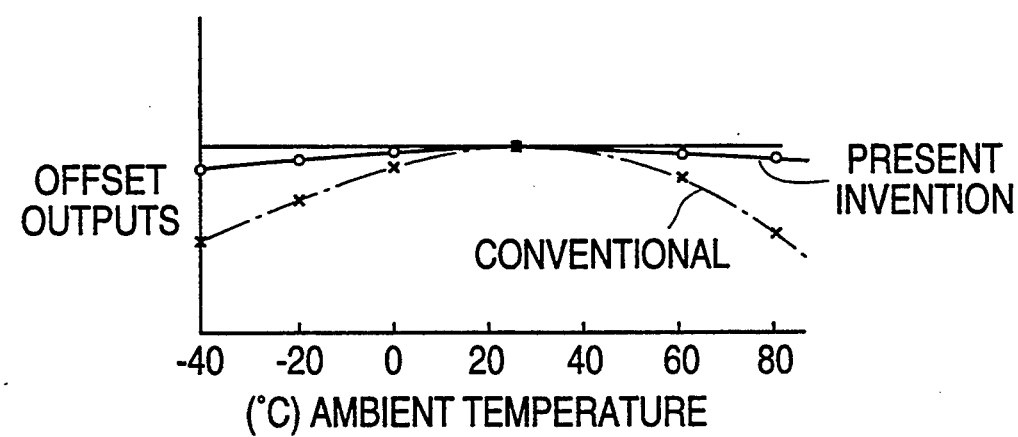
FIG. 4 is a diagram showing the response of two offset outputs to a change in the ambient temperature comparing between the angular velocity sensor of the present invention and a conventional angular velocity sensor.
Figure 5:
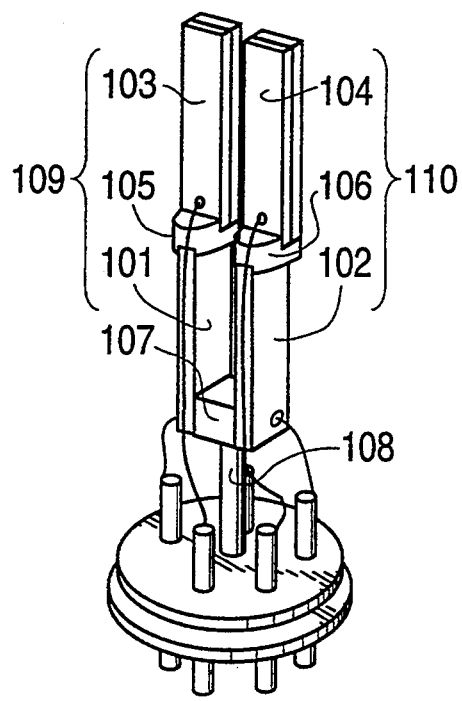
FIG. 5 is a perspective view of the conventional angular velocity sensor.
Figure 6:
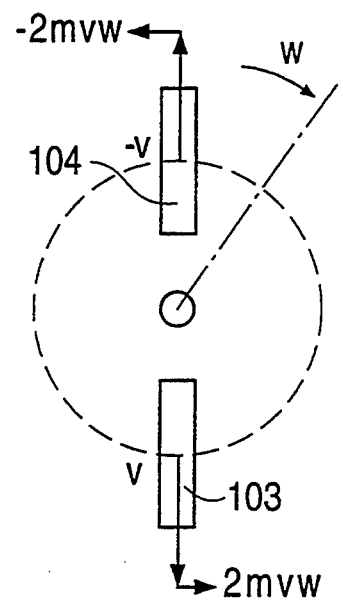
FIG. 6 is an explanatory view showing the principles of detecting an angular velocity with the conventional angular velocity sensor.
Figure 7:
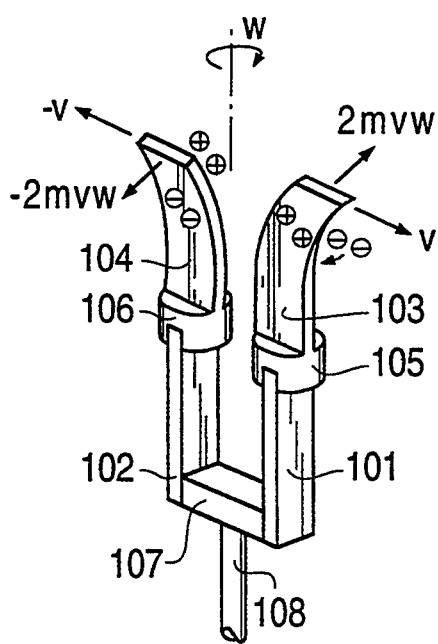
FIG. 7 is a perspective schematic view explaining the detection of an angular velocity with the conventional velocity sensor.

FIG. 4 is a diagram showing the comparison of temperature-vs-offset output response between the sensor of the present invention and the conventional sensor. As apparent from FIG. 4, the change in the offset output of the sensor of present invention is as low as about 1/5 of that of the conventional sensor while the temperature varies from −40° C. to 85°.

Also, the sensitivity and the offset output were measured for comparison while 100 cycles of thermal shocks between −40° and 85° C. are being applied. It was found that the sensor of the present invention exhibited the changes in the sensitivity and the offset output equal to less than ½ and 1/5 respectively of those of the conventional sensor.

The results prove that the two vibrators 1 and 2 are well balanced without suffering from residual stresses because their respective metal base plates 3 and 4 are bent 90 degrees at higher precision along the widthwise-center bending lines defined by the opposite pair slits 3b, 3c and 4b, 4c respectively.

Figure 3:
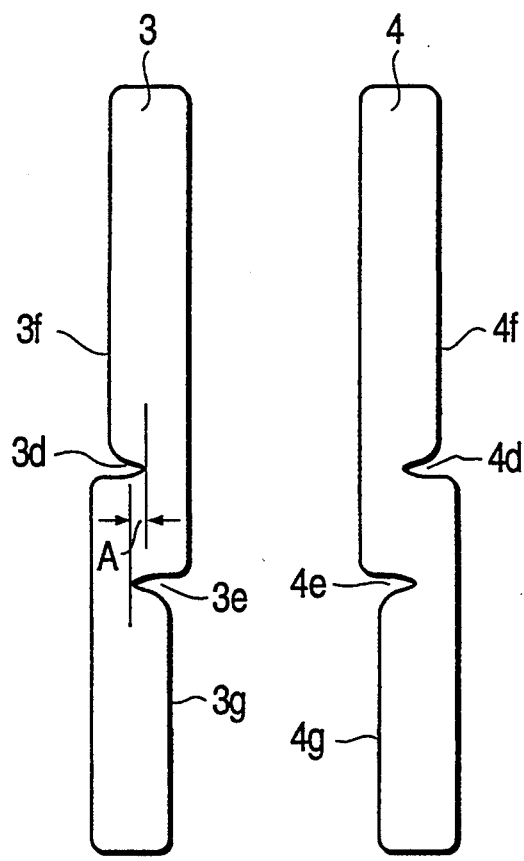
FIG. 3 is a plan view of the metal base plates of an angular velocity sensor of another embodiment.

FIG. 3 shows another embodiment of the present invention in which the metal base plate is modified in shape and size. The metal base plate of this embodiment is greater in the thickness and needs to be bent with more dimensional accuracy. When the metal base plate is bent along a predetermined bending line, its thickness may largely affect a bending action. More specifically, the resultant bend appears off the bending line or short of the innermost end of the slit. For compensation, the metal base plate of this embodiment has two slits (3d and 3e) provided deep therein so that they overlap each other by a distance of A shown in FIG. 3. The distance A is to offset the effect of the thickness in the bending action. Also, this embodiment shown in FIG. 3 permits one of the two edges at the slit side of the metal base plate to be ground off by a given depth for controlling the balance. As shown, the edge 3f at the slit 3d side is recessed and the edge 3g at the slit 3e side is also recessed.

In this embodiment, the thickness of the metal base plate is of great concern. If the metal base plate is 2 mm to 3 mm in width, 10 mm in length, and 0.5 mm in thickness, the overlap distance of 0.5 mm is given with the slit of 1.5 mm to 2.5 mm long. Also, the corresponding edge of the metal base plate is recessed by 0.4 mm to 0.8 mm preferably.

Although the slits provided in the embodiments are cut widely for ease of observation, they may be narrower in width and harder to view but give the same effect. While the tuning-fork construction is provided with the vibrators having the detectors and actuators, one of the actuators may be utilized to produce a monitor signal output upon being driven. It is also possible that the tuning-fork construction of the sensor is successfully implemented by a U-shaped vibrator unit which substitutes for the metal block 7 supporting the two vibrators.

As set forth above, each detector of the tuning-fork structure is balanced at center in the weight and will rarely be twisted during vibration. Accordingly, unwanted vibrating components on the detectors will be minimized. The angular velocity sensor of the present invention thus remains steady in thermal characteristics and gives less response to any abrupt thermal change throughout a wide range of temperature. Also, the bending of the metal base plates is executed with much ease and accuracy due to the slits and will be low in cost.

We claim:
1. An angular velocity sensor comprising:
   two metal base plates, each of said metal base plates having two opposite notches provided in the center thereof and extending horizontally from an edge to a center for ease of bending, an upper portion of each of said metal base plates being bent about 90 degrees from a lower portion of each of said metal base plates, so that the bent upper portion of each of said metal base plates are orthogonal to the lower portion of each of said metal base plates;
   a plurality of piezoelectric elements, a piezoelectric element being bonded to a surface of each of the upper and lower portions of each metal base plates;

an electrode block coupling the lower portion of the two metal base plates to each other so as to form a tuning-fork construction; and the piezoelectric element on the upper portion of each of said metal base plates serves as a detector and the piezoelectric element on the lower portion of each of said metal base plates serves as an actuator, wherein the two opposite notches of each of said metal base plates consist of a first notch and a second notch which extend from opposite edges of the metal base plates to a vertical center line of the metal base plates in a vertical spaced relationship, 2. The angular velocity sensor according to claim 1, wherein the two opposite notches of each of the metal base plates form first and second slits extending from opposing side edges of each of the metal base plates to a center region and are vertically spaced from each other on each of the metal base plates.

3. The angular velocity sensor according to claim 2, wherein the first and second slits of each of the metal base plates extend from the opposing side edges of each of the metal base plates to a substantially center line of each of the metal base plates.

4. The angular velocity sensor according to claim 2, wherein the first and second slits extending from the opposing side edges to the substantially center line of each of said metal base plates are substantially equal to each other in length.

5. The angular velocity sensor according to claim 4, wherein the first and second slits are horizontally extended to an overlapping distance at the center region of each of the metal base plates, which corresponds to a thickness of the metal base plates during bending.

6. An angular velocity sensor comprising:

two metal base plates, each of said metal base plates having two opposite notches provided in the center thereof and extending horizontally from an edge of each of the metal base plates to a center for ease of bending, each of said metal base plates being bent about 90 degrees so that two bent parts of each of the metal base plates are orthogonal to each other;

piezoelectric elements bonded to surfaces of the two bent parts of each of the metal base plates;

an electrode block coupling the two metal base plates with the piezoelectric elements to each other so as to form a tuning fork construction; and said piezoelectric elements on the two bent parts of each of said metal base plates serve as an actuator and a detector, said two metal base plates being coupled at an actuator side to each other by the electrode block, the two opposite notches of the metal base plates consisting of a first slit and a second slit which extend from opposite edges of each of said metal base plates respectively to a vertical center line of each of said metal base plates in a vertical spaced relationship, wherein one side edge of each of said metal base plates where the first slit is provided is beveled to a predetermined distance and the other side edge of each of said metal base plates where the second slit is provided is beveled to a corresponding distance in order to maintain a balanced form for each of said metal base plates.

7. An angular velocity sensor comprising two vibrators, each of said vibrators consisting of a lower portion forming an actuator and an upper portion forming a detector arranged orthogonal to each other, said two vibrators being coupled to each other at each of said lower portion to form a tuning-fork structure, each of said vibrators being formed of a metal base plate which is bent about 90 degrees along a center line defined by two opposite slits extending from opposing side edges of each of said vibrators to a central region of each of said the metal base plate so that an upper part and a lower part of each of the metal base plate, separated by the center line, are orthogonal to each other, wherein piezoelectric elements are bonded to the upper part and the lower part of the metal base plate forming each of the vibrators.

* * * * *